ELECTRICAL-CONNECTOR

Filed June 2, 1965

INVENTORS
JAMES W. MAYO
JAMES E. MICHAEL

BY

ATTORNEYS

United States Patent Office 3,421,134
Patented Jan. 7, 1969

3,421,134
ELECTRICAL CONNECTOR

James W. Mayo, Newport News, and James E. Michael, Hampton, Va., assignors to the United States of America as represented by the Administrator of the National Aeronautics and Space Administration Filed June 2, 1965, Ser. No. 460,876
U.S. Cl. 339—150 3 Claims
Int. Cl. H01r 25/06

ABSTRACT OF THE DISCLOSURE

This invention relates to an electrical adaptor for distributing current to several electrical circuits from a lesser number of electrical circuits. It comprises a cylindrical housing having external threads on one end and internal threads on the other. A plurality of distributor plates having a single contact protruding from one side and a plurality of contacts protruding from the other are positioned between insulators mounted within the casing.

The invention described herein may be may be manufactured and used by or for the Government of the United States of America for governmental purposes without the payment of any royalties thereon or therefor.

This invention relates to the distribution of electrical current and has particular reference to electrical adapters having a capability of distributing current and voltage to any number of electrical circuits from a single or any number of circuits.

Commercial electrical connectors and adapters have used for years in the transfer of electrical current and are extensively used in electrical circuits where it is necessary to connect or disconnect a circuit in order to provide ease of installation or removal, or maintenance of equipment. Generally, these connectors are available with the same number and arrangement of pins and sockets in each shell half and are utilized as a means of transferring electric current from one conductor or wire to another with the intent that they provide electrical continuity from each conductor on one end to only one conductor on the opposite end.

The advent of aerospace travel has brought about unique conditions for electrical circuitry. For example, it is necessary to utilize, where at all possible, compact and simple devices with extremely high reliability. In the aerospace environment, reliability is of the utmost importance due to the fact that the failure of one item, especially an electrical connection, may prevent operation of a multitude of other devices. The reliability depends greatly upon the environment of use. For example, during the launch cycle there are considerable vibratory motions that tend to disengage or break generally known electrical connection devices. Another factor involved in the electrical circuits of aerospace vehicles is that in many instances a single or relatively few electrical leads may have to be divided into a relatively large number of leads to other equipment. Conversely, a multitude of leads from electrical equipment may have to be channeled into a single or relatively few electrical leads.

The prior art connector devices are unable to provide the function of transferring electrical current and voltage from one to many or many to one lead if they are constructed with a one-to-one pin-to-socket arrangement. Previously known devices are also unreliable due to the failure of splices, soldering and faulty clamps. These failures become even more pronounced where operating conditions involve extreme vibrations. There is also the disadvantage of numerous short circuits due to solder spurs and sharp ends of wire that pierce the insulation at the juncture. In an effort to obtain integrity of electrical joints, it has been a practice to "stack" electrical terminal lugs on a barrier or terminal strip or to mechanically attach the electrical leads by the use of clamps and the like. The stacking of terminal lugs and mechanical clamping has the inherent characteristic of losing its electrical integrity by the loosening of the screws or mechanical fasteners. This is especially true in the vibrational environment experienced in aerospace vehicles.

To overcome the above noted difficulties, the present invention contemplates the use of a distributor plate having a different number of pins or sockets extending from opposite sides thereof and mounted within a casing while being insulated therefrom.

It is an object of the instant invention to provide an electrical adapter capable of distributing current and voltage to any number of circuits from a single or any other number of circuits.

Another object of this invention is to provide an electrical adapter for maintaining electrical integrity during transfer of electrical current from one conductor to many conductors or from many conductors to fewer number of conductors.

A further object of this invention is to provide a simple, compact electrical adapter that is lightweight and has high reliability during use in environments of high vibratory motion.

Still another object of the instant invention is to provide a versatile electrical adapter in which any combination of leads on one end, by proper design of the internal network, results in the desired distribution of electrical current and voltage to any number of electrical leads on the opposite end.

A still further object of this invention is to provide an electrical adapter wherein a distributor has connectors extending from opposite sides thereof which are insulated from a protective casing in which the plate is mounted.

Still another object of this invention is to provide an electrical adapter meeting the above objectives which can be made compatible for mating with commercially available connectors.

Generally, the foregoing and other objects are accomplished by locating a distributor plate between insulators mounted in a casing. Any number of pins or sockets may extend from one side of the distributor plate through the layer of insulation on that side any other number of pins or sockets may extend from the opposite side of the distributor plate through the layer of insulation on that side.

A more complete appreciation of the invention and many of the attendant advantages thereof will be readily apparent as the same becomes better understood by reference to the following description when considered in connection with the accompanying drawings wherein.

Figure 1:
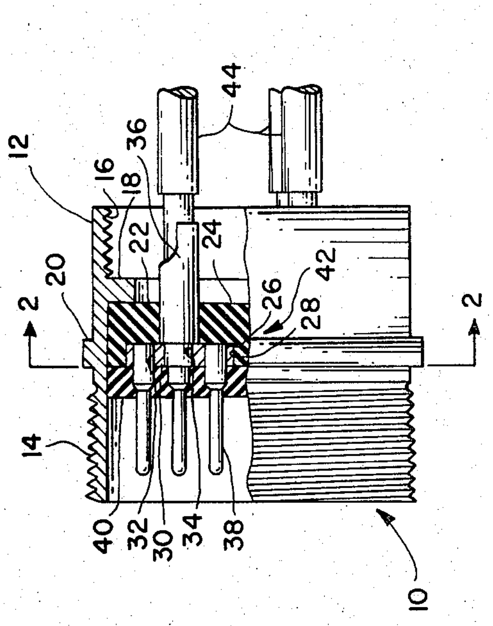
FIG. 1 is an elevational view in partial section of the instant invention.
Figure 2:
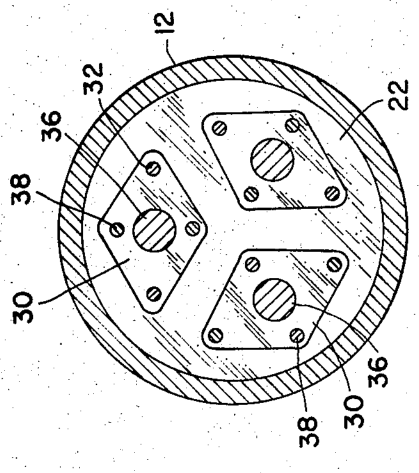
FIG. 2 is a cross-sectional view taken on line 2—2 of FIG. 1.

Referring now to the drawing wherein one embodiment of the instant electrical adapter, generally designated by reference numeral 10, is shown as having casing 12 with external threads 14 on one end and internal threads 16 on the other end. Although casing or shell 12 is shown as having a circular or cylindrical configuration it is to be readily understood that any desired shape may be utilized. Interior flange 18 extends inwardly from the inner surface of casing 12 from a point adjacent the end of internal threads 16 and serves as an abutment as will be described more fully hereinafter. Exterior flange 20 extends outwardly from the outer surface of shell 12 and at right angles thereto to provide reinforcement and an abutment for assistance in assembling the mating connector to be secured to the elements within shell casing 12.

Mounted in substantially fixed position within casing 12 is distributor assembly 42 which includes cup-shaped insulator 22 having surfaces 24 and 26 which span the interior dimension of casing 12. Surface 24 abuts the face of interior flange 18 that is away from internal threads 16. Surface 26 of insulator 22 is provided with recess 28 for receiving distributor plate 30. It is to be understood that the shown embodiment of the invention includes three distributor plates 30, but any number or any shape of distributor plate may be utilized depending upon design requirements. For example, distributor plates 30 could be concentric rings or parts thereof.

Distributor plate 30 has a plurality of openings or bores 32 and 34 which extend thereinto from opposite faces thereof. As seen in FIG. 1, bores 34 extend into distributor plate 30 from the side abutting the bottom of recess 28 and bores 32 extend into the side opposite to that abutting the bottom of recess 28. Wire connectors 36 extend through insulator 22 and are fixedly secured into bore 34. Connector means 38 are fixedly secured in bores 32 and may be either pins or sockets, depending upon the connection to be made, as is also the situation with wire connector 36. A second insulator plate 40 abuts distributor 30 and insulates connector means 38 from casing 12 and any element connected thereto from contact with distributor plate 30 other than by connector means 38. It is to be understood that an alternative embodiment of the invention might utilize individual insulated wires that extend from connectors 38 to connectors 36 where several would be secured at each terminal and thus avoid the necessity of distributor plate 30.

It is readily apparent that an electrical lead or a group of leads would be attached to connectors 36 on one side of electrical adapter 10 and a second lead or group of leads would be attached to pins or sockets 38 on the other side of distributor plate 30 to thereby provide an electrically integral conduit for transferring electrical current and voltage from one number of leads to any other number of leads. The actual distribution from the input to the output of adapter 10 depends upon the circumstances to be encountered. Thus, it is seen that it is merely necessary to insert a wire, for example lead 44 into connector 36 and where necessary and proper equipment exists a lock element may be threaded or engaged with internal threads 16 to aid in insuring that a reliable connection is maintained. A group of electrical leads (not shown) would be attached to connectors 38 and again a locking mechanism may threadedly engage external threads 14 to assist in maintaining an integral connection between the first and second leads.

From the above description it is readily apparent that the instant invention provides a versatile electrical adapter that is simple and compact while being extremely reliable. Electrical integrity is maintained from one group of electrical leads to another to permit distribution or integration of a plurality of electrical sources into another plurality of outputs. The instant electrical adapter is also advantageous in that the distributor assembly 42 may be readily modified to permit use of any or all of the connector means 36 and 38 merely depending upon the attachments therefor. Electrical adapter 10 is easily accessible and may be replaced with a minimum of effort by another adapter of different configuration depending upon the results desired.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. An electrical adapter capable of distributing current and voltage to any number of electrical circuits from a single or multiple circuit comprising: a cylindrical shell having external threads on one end and internal threads on the other end; an exterior flange extending about the circumference of said shell and spaced from said external threads; an internal flange extending about the interior face of said shell at the inner end of said internal threads; a first insulator positioned in said shell and having one face in abutting relation with said interior flange; a plurality of recesses in the opposite face of said first insulator; distributor plates disposed in said recesses and having pluralities of bores therein; one of said bores located substantially centrally of each of said plates and the remaining bores spaced about the peripheries of said plates; wire connectors secured in said centrally located bores and extending through said first insulator; connector members secured in said peripherally spaced bores and extending oppositely to said wire connectors; and a second insulator in juxtaposition to said plate and through which said connector members extend whereby any number of electrical inputs may be connected to any other number of electrical outputs.

2. An electrical adaptor for use in a locale of high vibratory motion comprising: casing means for protection and support of connector means; said casing means externally threaded at one end and internally threaded at the other end to provide enhanced rigidity of the connection between the electrical inputs and outputs; at least two insulators mounted in and spanning the interior of said casing means in juxtaposition to one another; a flange extending inwardly from the interior of said casing means at the inner end of said internal threads to provide an abutment for one of said insulators; distributor means disposed between said insulators; connector means secured to said distributor means and extending in opposite directions therefrom through said insulators; a greater number of said connector means extending from one side of said distributor means than from the other side thereof, whereby a number of electrical inputs up to the number of connector means extending from one side of said distributor means are electrically connected to a number of electrical outputs equal to or less than the number of connector means extending from the other side of said distributor means to provide a simple, sturdy, reliable and easily releasable electrical connection.

3. The electrical adapter of claim 2 wherein one of said insulators is recessed; and said distributor means disposed in said recess to be completely insulated from said casing means and any external element except said connector means.

References Cited

UNITED STATES PATENTS

| | | | |
|---|---|---|---|
| 2,450,528 | 10/1948 | Sprigg | 339—176 |
| 3,054,078 | 9/1962 | Baschkin | 339—19 X |
| 3,086,188 | 4/1963 | Ross | 339—176 X |
| 3,219,963 | 11/1965 | O'Keefe | 339—92 X |
| 3,263,202 | 7/1966 | Dean et al. | 339—150 |

RICHARD E. MOORE, *Primary Examiner.*

J. R. MOSES, *Assistant Examiner.*